(12) United States Patent
Naya

(10) Patent No.: US 7,518,800 B2
(45) Date of Patent: Apr. 14, 2009

(54) SOLID STATE IMAGING DEVICE

(75) Inventor: Masayuki Naya, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 57 days.

(21) Appl. No.: 11/882,921

(22) Filed: Aug. 7, 2007

(65) Prior Publication Data

US 2008/0037132 A1 Feb. 14, 2008

(51) Int. Cl.
  *G02B 27/10* (2006.01)
(52) U.S. Cl. .................................. 359/619; 359/621
(58) Field of Classification Search ......... 359/619–626; 250/208.1; 348/340, 275, 285, 311, 335
  See application file for complete search history.

(56) References Cited

U.S. PATENT DOCUMENTS

| 6,252,219 | B1* | 6/2001 | Abe ........................ 250/208.1 |
| 6,259,083 | B1* | 7/2001 | Kimura .................... 250/208.1 |
| 7,259,791 | B2* | 8/2007 | Fukusho et al. ............. 348/340 |
| 7,309,562 | B2* | 12/2007 | Tomizawa ................... 430/321 |
| 7,446,356 | B2* | 11/2008 | Misawa ....................... 257/291 |
| 2007/0145241 | A1* | 6/2007 | Tani ......................... 250/208.1 |
| 2007/0146513 | A1* | 6/2007 | Kuroiwa ..................... 348/272 |
| 2007/0172970 | A1* | 7/2007 | Uya ............................ 438/22 |

FOREIGN PATENT DOCUMENTS

JP  2002-94038 A  3/2002

* cited by examiner

*Primary Examiner*—Alicia M Harrington
(74) *Attorney, Agent, or Firm*—Birch, Stewart, Kolasch & Birch, LLP

(57) ABSTRACT

A solid state imaging device includes a semiconductor substrate with photodiodes, transfer electrodes on the semiconductor substrate, a light shielding film with openings above the photodiodes and covering the transfer electrodes, and inner lenses located above the openings. Each inner lens has an upper convex lens surface and a lower convex lens surface which projects into the opening. The lower convex lens surface has a light exit surface, at the bottom, which faces the photodiode. Except this light exit surface, the lower convex lens surface is covered with a reflective film. The upper convex lens surface converges the incident light on the inner lens to a diameter smaller than a maximum diameter of the lower convex lens surface. In the lower convex lens surface, the reflective film reflects the light to the light exit surface.

5 Claims, 5 Drawing Sheets

SOLID STATE IMAGING DEVICE

FIELD OF THE INVENTION

The present invention relates to a solid state imaging device, such as a CCD image sensor.

BACKGROUND OF THE INVENTION

Digital cameras are widely used which convert images captured by a solid state imaging device, such as a CCD, into digital image data and store the data in recording media such as an internal memory and a memory card. The solid state imaging device in such digital cameras includes a semiconductor substrate on which light receiving elements (photodiodes) are arranged in a matrix form, a light shielding layer placed on the semiconductor substrate and having openings on each of the light receiving elements, and microlenses located above the light shielding layer. Light rays from an imaging optical system are converged by the microlenses and transmitted through the openings to the light receiving elements.

In these days, the solid state imaging devices are becoming even smaller yet hold more pixels, and the openings are getting smaller in dimension accordingly. As a result, it is becoming difficult to focus light rays toward the light receiving elements strictly by the conventional microlenses. In view of this deficiency, Japanese patent laid-open publication No. 2002-094038 discloses a solid state imaging device with an in-layer lens structure located between the photodiodes and the color filter so as to improve the focusing efficiency.

This solid state imaging device also has a reflective metal film, underneath the in-layer lens structure, to reflect light into the photodiodes.

Even with this structure, however, the focusing efficiency is hardly improved to a considerable extent, and a kind of noise, or so-called smear that appears as white streaks on the photographed image may sometimes be caused. Namely, the incident light that would normally go through the opening of the light shielding film and enter the photodiode is insufficiently focused, and enters the transfer electrode proximate to the photodiode. Such light induces electrical charge in the transfer electrode, which will cause the smear.

Additionally, some kinds of light may even penetrate the reflective metal film located underneath the in-layer lens structure of the above prior art device. Again, in this case, the smear will be caused.

SUMMARY OF THE INVENTION

In view of the foregoing, a primary object of the present invention is to provide a solid state imaging device for improving efficiency to focus light into light receiving elements.

Another object of the present invention is to provide a solid state imaging device for preventing light from leaking out of an in-layer lens structure.

In order to achieve the above and other objects, the solid state imaging device according to the present invention includes inner lenses above openings which are formed on a light shielding film so as to correspond to light receiving elements. Each of the inner lens has an upper convex lens surface and a lower convex lens surface projecting into the opening. The upper convex lens surface converges the incident light to a diameter smaller than a maximum diameter of the lower convex lens surface. The lower convex lens surface has a light exit surface at the bottom, from which the incident light exits to the light receiving element. Additionally, the lower convex lens surface, except the light exit surface, is covered with a reflective film. This reflective film reflects the incident light to the light exit surface.

It is preferred that the upper convex lens surface has a maximum diameter larger than the diameter of the lower convex lens surface. Also, the upper convex lens surface preferably has a hemispherical shape.

The reflective film is preferably made of metallic material and thicker than a skin depth of the incident light. It is also preferred that the light exit surface has a diameter D defined as a formula, $\lambda/n < D < L$, where $\lambda$ is a wavelength of the incident light, n is a refractive index of said inner lens, and L is an interior diameter of the opening.

In another preferred embodiment of the present invention, the inner lens has a light guide integrated with the lower convex lens surface. This light guide extends toward the light receiving element, and is covered with the reflective film.

According to the solid state imaging device of the present invention, the incident light is surely guided by the upper convex lens surface to the lower convex lens surface. The light in the lower convex lens surface is then guided by the reflective film to the light exit surface. Therefore, the focusing efficiency is improved.

Additionally, the reflective film that is of metal and thicker than the skin depth of incident light prevents light leaks from the lower convex lens surface. This leads to eliminate the cause of image smear, i.e., entering of light into the transfer electrodes. Owing to the light exit surface with the diameter D in the range of $\lambda/n < D < L$, the light incident on the lower convex lens surface is more surely guided to the light receiving element, and the focusing is more improved. The light guide, when formed integrally with the lower convex lens surface, guides the incident light to the light receiving element, still more improving the focusing efficiency of the solid state imaging device.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS

Figure 1:
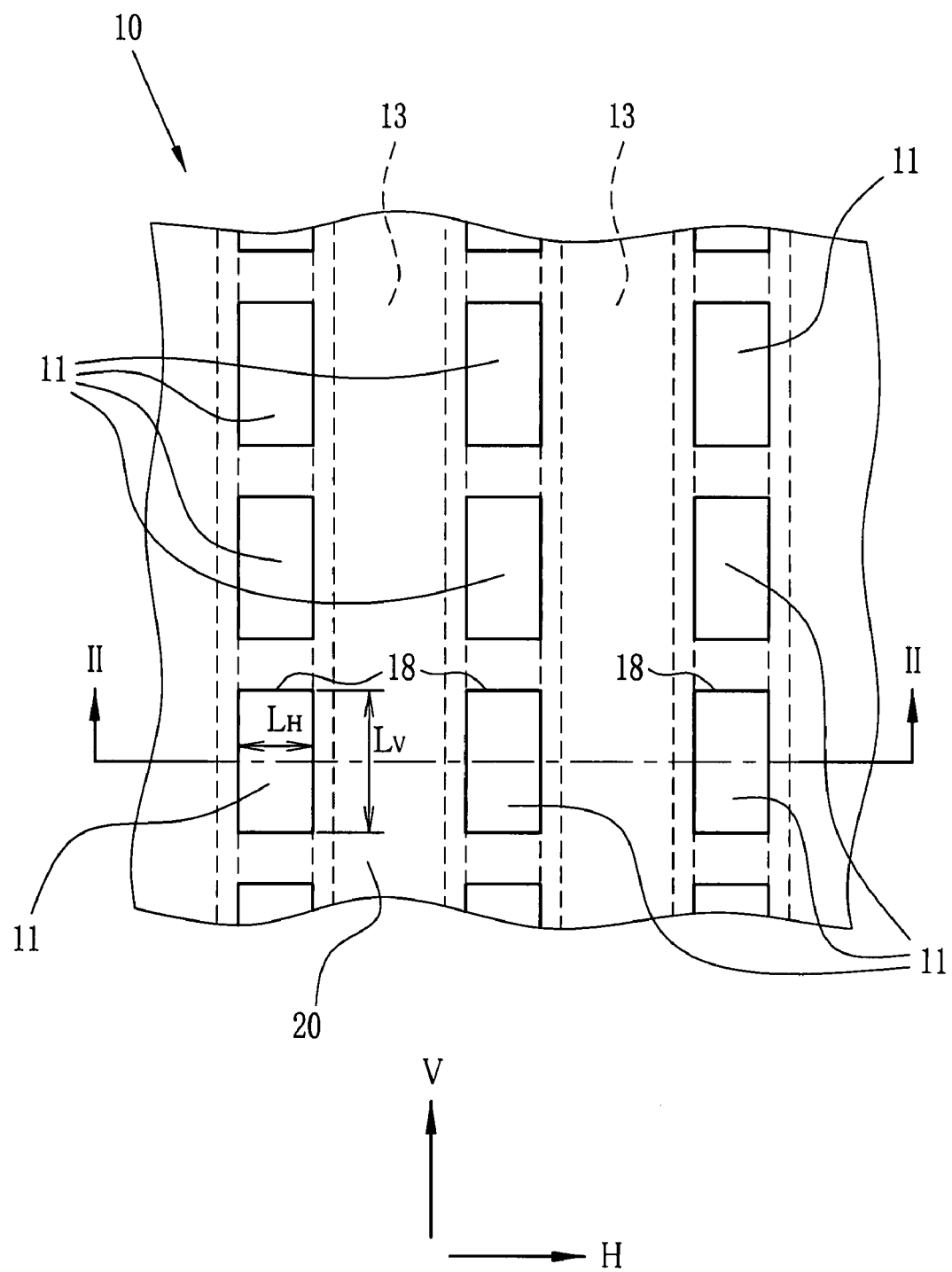
FIG. 1 is a plan view of a solid state imaging device according to the present invention.

Referring now to the drawings, there is shown in FIG. 1 a CCD 10 as a solid state imaging device. The CCD 10 has a plurality of photodiodes 11 arranged in a two-dimensional matrix on a semiconductor substrate 15 (see, FIG. 2), and a vertical transfer path 13 extending along each column of the photodiodes 11 in a vertical transfer direction V. Note that a micro-lens and a color filter on the semiconductor substrate 15 are not shown in FIG. 1.

Figure 2:
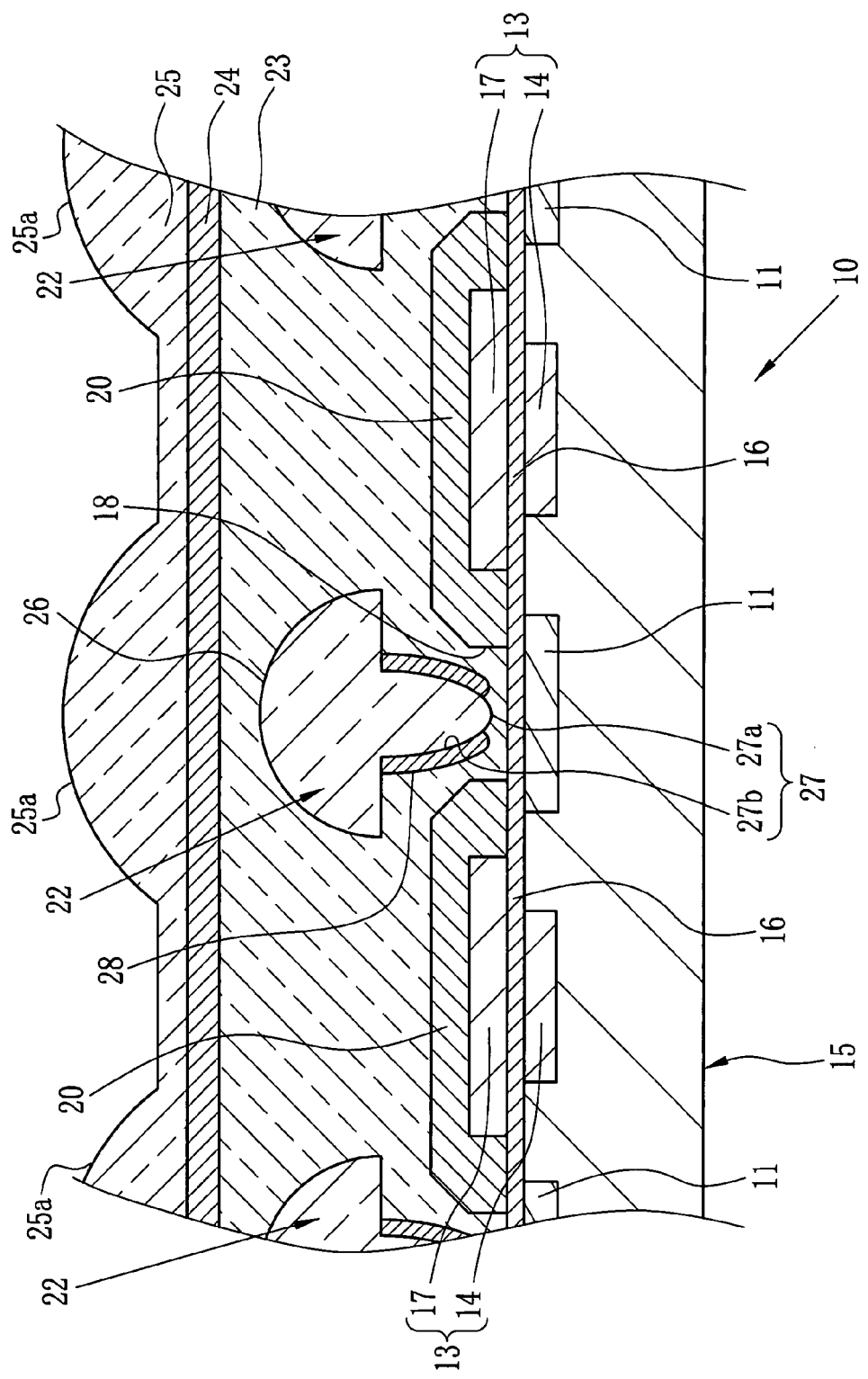
FIG. 2 is a cross section view along a line II-II of FIG. 1.

As shown in FIG. 2, the CCD 10 has the semiconductor substrate 15 on which the photodiodes 11 and charge transfer sections 14 are formed. Above the charge transfer sections 14 across an insulating layer 16, transfer electrodes 17 are formed. The charge transfer section 14 and the transfer electrode 17 constitute the vertical transfer path 13, which transfers the electric charges of the photodiodes 11 in the vertical direction. It is to be noted that the transfer electrodes 17 are polysilicon formed by, for example, a dry etching method. Also, the insulating layer 16 is $SiO_2$ formed by, for example, a thermal oxidation method or a CVD (Chemical Vapor Deposition) method.

Formed on the semiconductor substrate 15 is a light shielding film 20 which covers the transfer electrodes 17 from light. The light shielding film 20, made of aluminum or such metallic material grown by a sputtering method or the like, has openings 18 above the photodiodes 11. Each of the openings 18 is somewhat smaller than the photodiode 11, having a short side length $L_H$ and a long side length $L_V$ as shown in FIG. 1.

Provided above each photodiode 11 is an inner lens 22, which is enclosed in a planarizing layer 23. The inner lens 22 is made of, for example, SiN (Silicon Nitride; refractive index $N_2$=1.9 to 2.0), and the planarizing layer 23 is made of, for example, BPSG (Boron Phosphorous Silicate Glass; refractive index $N_1$=1.4 to 1.5). On a flat top surface of the planarizing layer 23, a color filter 24 and a micro-lens layer 25 are formed. The color filter 24 is made of resist material containing pigments of three colors (R, G, and B) or four colors (R, G, B, and neutral color). The micro-lens layer 25 has a convex lens surface 25a to focus the incident light into the photodiodes 11.

The inner lens 22 is a so-called in-layer lens structure, and includes an upper convex lens surface 26 that projects upwards, or away from the photodiode 11, and a lower convex lens surface 27 that projects downwards, or toward the photodiode 11. The upper convex lens surface 26 focuses the incident light into the lower convex lens surface 27.

Figure 3:
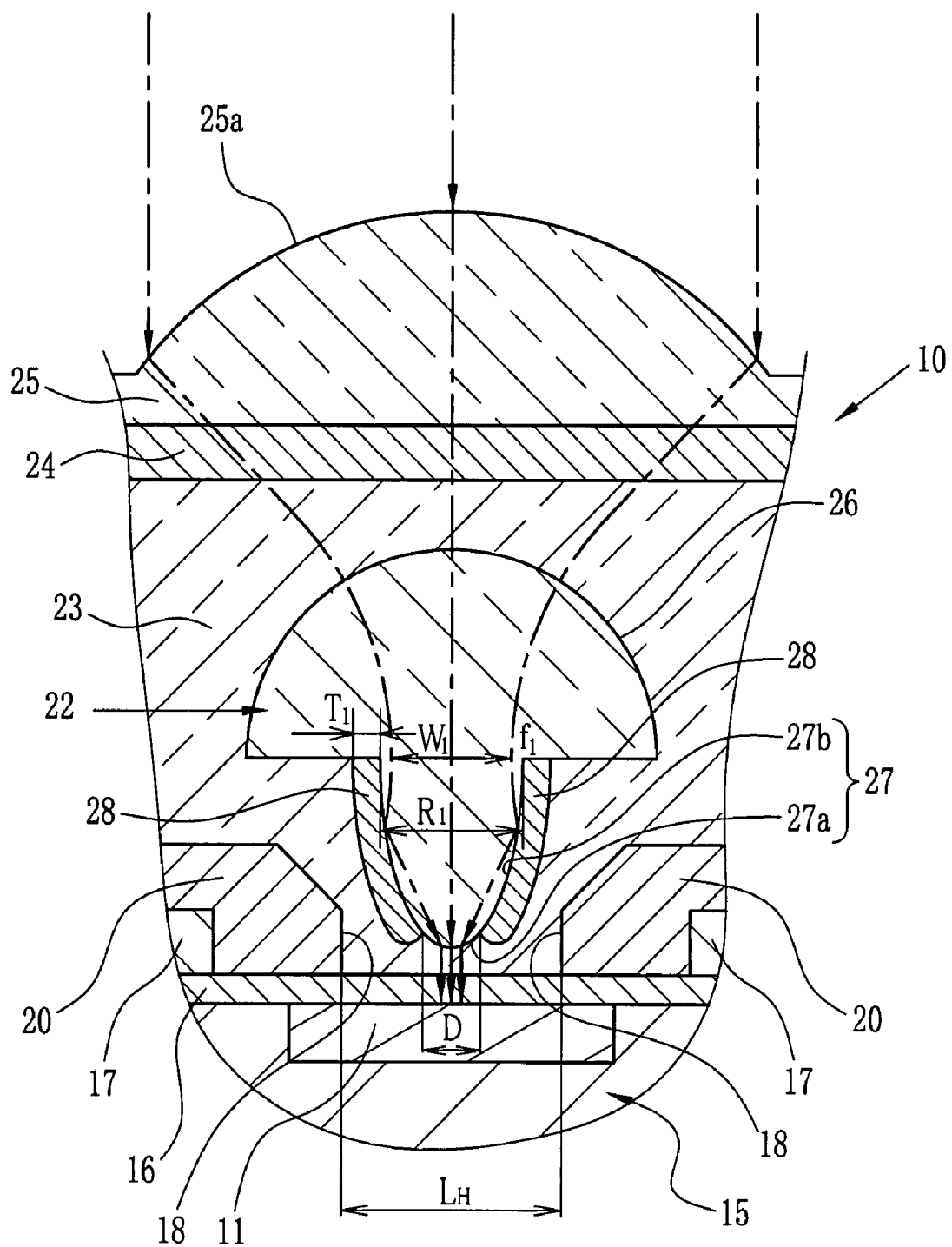
FIG. 3 is an enlarged cross section view of an inner lens and its proximity.

As shown in FIG. 3, the lower convex lens surface 27 extends into the opening 18, and includes a light exit surface 27a at the bottom and a reflective surface 27b continuing upwards from this light exit surface 27a. The reflective surface 27b is surrounded by a reflective film 28 of such metallic material as the light shielding film 20. The reflective film 28 reflects the light on the reflective surface 27b to the light exit surface 27a. The metallic material of the reflective film 28 may be, for example, gold (Au), silver (Ag), copper (Cu), or aluminum (Al).

The upper convex lens surface 26 converges the incident light to a focal point $F_1$ by the superior end of the lower convex lens surface 27. Due to the aberration of the upper convex lens surface 26, the focal point will move depending on the position and the angle of incident of light. In practice, therefore, the light on the upper convex lens surface 26 is converged to a diameter $W_1$ at the focal point $f_1$.

The diameter $W_1$ is smaller than a maximum diameter $R_1$ of the lower convex lens surface 27. Accordingly, the light incident on the inner lens 22 is surely directed to the lower convex lens surface 27. In the lower convex lens surface 27, the light reflects off the reflective surface 28 and proceeds to the light exit surface 27a.

The reflective film 28 has a film thickness $T_1$ thicker than a skin depth of the incident light. It is therefore possible to prevent the light from penetrating the reflective film 28. In the illustrated embodiment, the film thickness $T_1$ is 20-30 nm.

The wavelength of light in the inner lens 22 becomes $\lambda/n$, where $\lambda$ is the wavelength of the light in air, and n is the refractive index of the inner lens 22. In view of this fact, a diameter D of the light exit surface 27a of the lower convex lens surface 27 is determined to meet a Formula 1 below, where $L_H$ is, as noted, the short side length of the opening 18.

$$\lambda/n < D < L_H \quad \text{Formula 1}$$

Owing to this diameter D, the light that reflects off the reflective surface 27b is directed to the light exit surface 27a and the photodiode 11 more efficiently and certainly.

In Formula 1, the wavelength $\lambda$ will be the wavelength of the light to be received on the photodiode 11. For example, the wavelength $\lambda$ may be the wavelength of the color of the corresponding color filter 24. Alternatively, if all the lower convex lens surfaces 27 and all the openings 18 have the same size regardless of the color filter 24, the wavelength $\lambda$ may be the center wavelength within the visible light spectrum, or the wavelength of the R light which is the longest wavelength among R, G, and B light.

Next, the optical function of the present invention is explained. The light that enters the upper convex lens surface 26 through the micro-lens layer 25, the color filter 24, and the planarizing layer 23 is converged to the diameter $W_1$ which is smaller than the maximum diameter $R_1$ of the lower convex lens surface 27. Entering the lower convex lens surface 27, the light goes straight or reflects off the reflective surface 27b to the light exit surface 27a. It is therefore possible to improve the focusing efficiency to direct the light to the photodiode 11. Additionally, since the reflective film 28 has the film thickness $T_1$ thicker than the skin depth, the light does not leak out of the inner lens 22 from the reflective surface 27b. It is therefore possible to prevent the light from entering the transfer electrodes 17 proximate to the photodiodes 11, and to prevent the smear accordingly.

Figure 4:
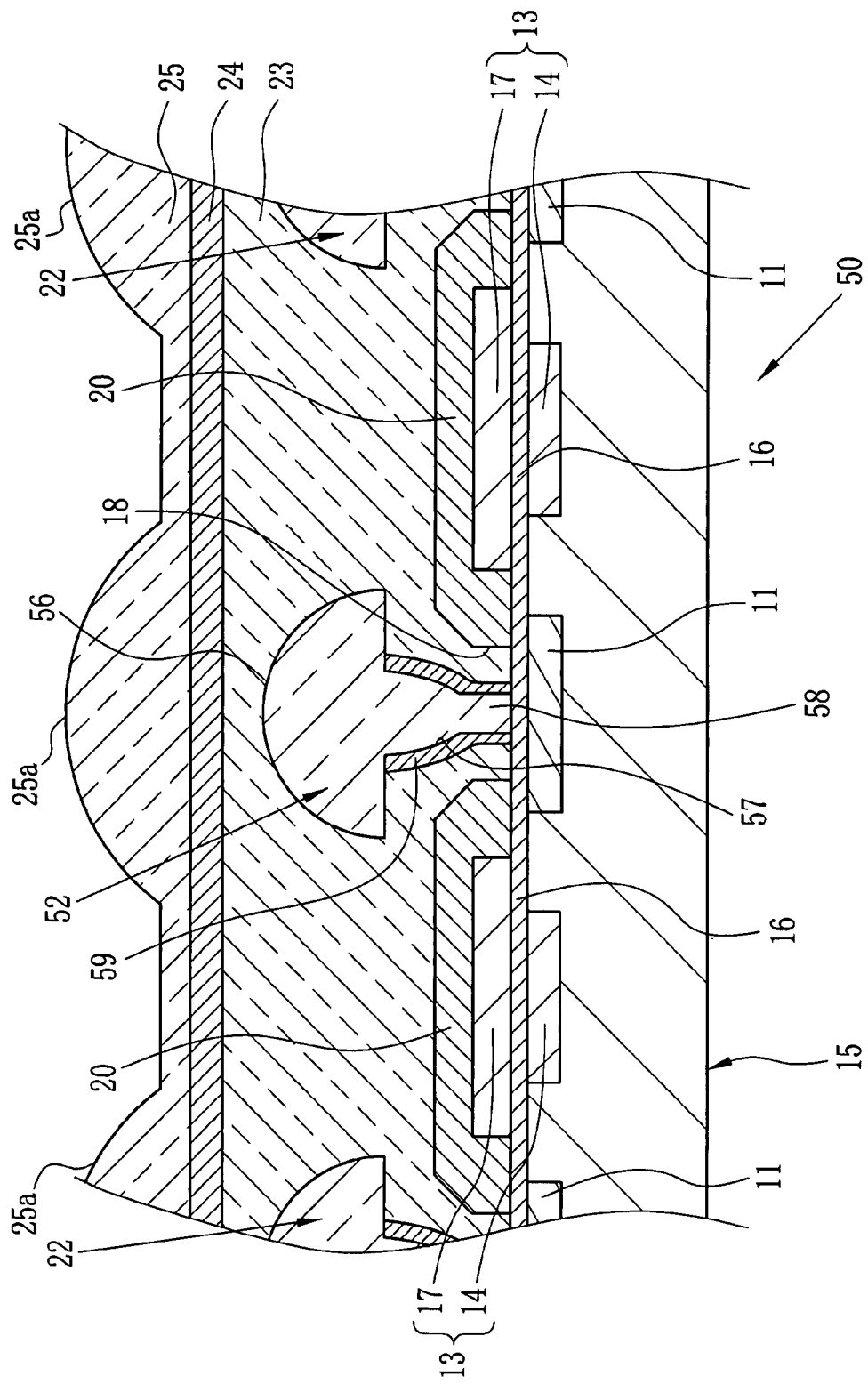
FIG. 4 is a cross section view of a solid state imaging device according to a second embodiment of the present invention.
Figure 5:
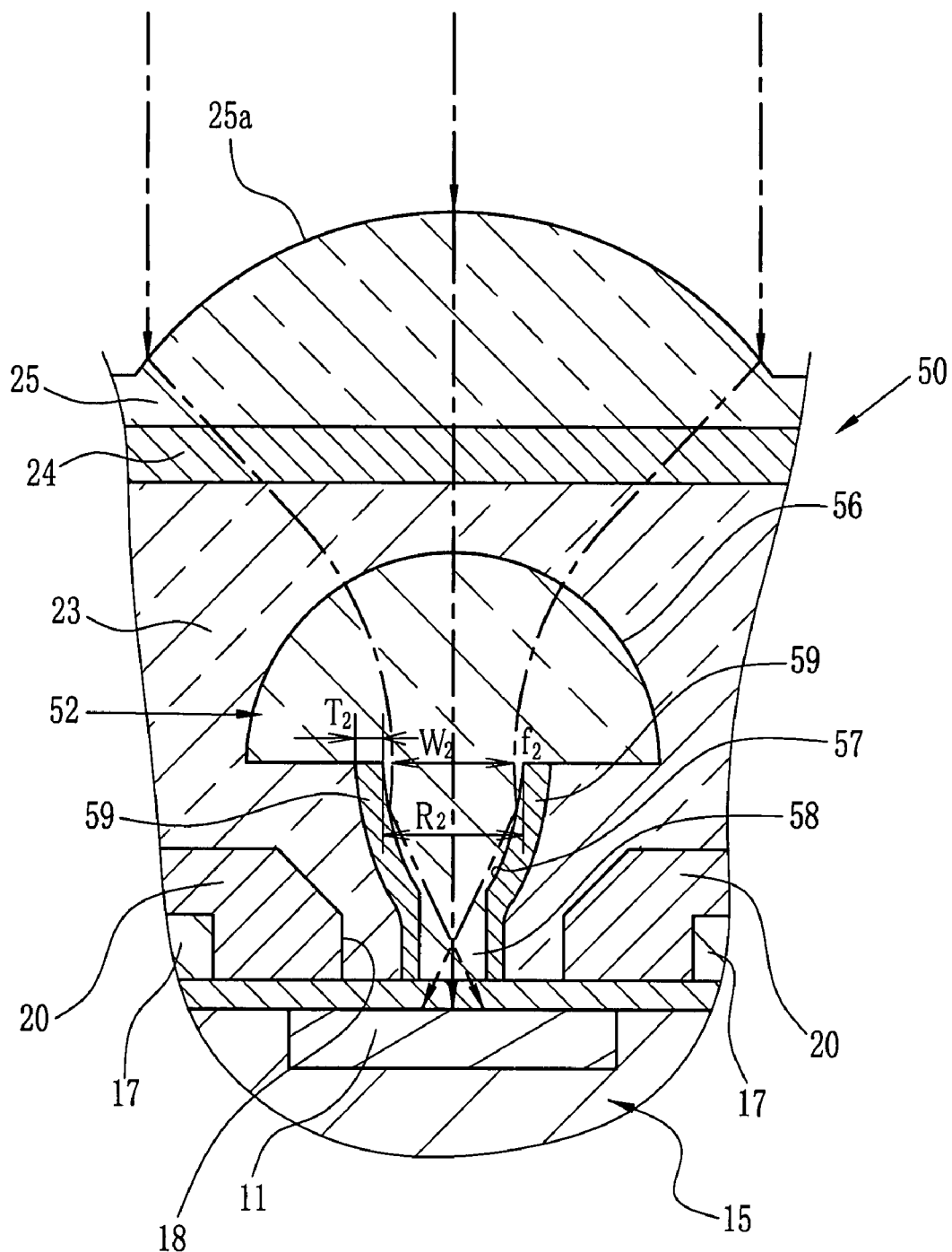
FIG. 5 is an enlarged cross section view of an inner lens of the second embodiment and its proximity.

In the above embodiment, a small gap filled with the planarizing layer 23 is there between each of the light exit surface 27a and the photodiode 11. However, the lower convex lens surface may be integrated with a light guide extending to the photodiode as shown in a CCD 50 of FIG. 4 and FIG. 5, where like elements are designated by like reference numerals and a detailed explanation thereof is omitted.

Each inner lens 52 has a light guide 58 integrated with a lower convex lens surface 57. The lower convex lens surface 57 and the light guide 58 are both surrounded by a reflective film 59 with a film thickness $T_2$ thicker than the skin depth. Therefore, the light incident on the lower convex lens surface 57 does not leak out of the inner lens 52. Similar to the reflective film 28 in the first embodiment, the film thickness $T_2$ is 20-30 nm. The light that enters an upper convex lens surface 56 through the micro-lens layer 25, the color filter 24, and the planarizing layer 23 is converged at a focal point $f_2$ to a diameter $W_2$ which is smaller than a maximum diameter $R_2$ of the lower convex lens surface 57, and surely enters the lower convex lens surface 57. In the lower convex lens surface 57, the light reflects off the reflective film 59 and proceeds to the light guide 58 in which it is guided to the photodiode 11. Accordingly, the focusing efficiency is improved and the sensitivity of the photodiodes 11 is increased.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A solid state imaging device including a semiconductor substrate with light receiving elements formed thereon, and a light shielding film with openings above said light receiving elements and for covering at least a part of said semiconductor substrate, comprising:

inner lenses each located above one of said openings and having an upper convex lens surface and a lower convex lens surface which projects into said opening, said upper convex lens surface converging incident light to a diameter smaller than a maximum diameter of said lower convex lens surface, said lower convex lens surface having a light exit surface at the bottom from which said incident light exits toward said light receiving elements; wherein said upper convex lens surface has a maximum diameter larger than said maximum diameter of said lower convex lens surface; and a light shielding film on each of said inner lenses and covering said lower convex lens surface except said light exit surface, for reflecting said incident light to said light exit surface.

2. The solid state imaging device of claim 1 wherein said upper convex lens surface has a hemispherical shape.

3. The solid state imaging device of claim 1, wherein said reflective film is made of metallic material and thicker than a skin depth of said incident light.

4. The solid state imaging device of claim 1, wherein said light exit surface has a diameter D defined as follows:

$$\lambda/n < D < L$$

where $\lambda$ is a wavelength of said incident light, n is a refractive index of said inner lens, and L is an interior diameter of said opening.

5. The solid state imaging device of claim 1, further comprising:

a light guide integrated with said lower convex lens surface and extending toward said light receiving element, wherein said reflective film covers said lower convex lens surface and said light guide.

* * * * *